UNITED STATES PATENT OFFICE.

FRITZ LÜRMANN, OF GEORGSMARIENHÜTTE, NEAR OSNABRÜCK, PRUSSIA.

IMPROVEMENT IN THE MANUFACTURE OF ARTIFICIAL STONE FROM BLAST-FURNACE CINDER.

Specification forming part of Letters Patent No. 125,312, dated April 2, 1872.

*To all whom it may concern:*

Be it known that I, FRITZ LÜRMANN, of Georgsmarienhütte, near Osnabrück, Prussia, have invented or produced a new and useful Composition of Matter for use as Artificial Stone in Building and for other purposes, including the manufacture of tubes and various vessels or articles; and I do hereby declare that the following is a full, clear, and exact description of the same.

My invention consists in a mixture of the cinder of blast-furnaces with quicklime or other caustic material or cement.

In carrying out my invention, I take blast-furnace cinder and, placing it in a suitable vessel or receiver, granulate the same either by pouring in water or by mechanical means, and then mix it with quicklime or other caustic material or cement. The mass is then put into moulds or otherwise collected and pressed or formed into any required shape, using for the purpose either hand force, steam power, or hydraulic pressure. The composition or article into which it is thus formed is afterward hardened by exposure to the air, no artificial heating or burning being necessary. The proportion of cinder to the quicklime or other caustic material or cement will vary according to the chemical properties of the materials used and other circumstances.

What is here claimed, and desired to be secured by Letters Patent, is—

The composition of matter herein described, composed of the cinder of blast-furnaces and quicklime, or other caustic material or cement, for use as artificial stone in building and other purposes.

FR. LÜRMANN.

Witnesses:
PETER BARTHEL,
FRANZ WIRTH.